United States Patent Office 3,259,983
Patented July 12, 1966

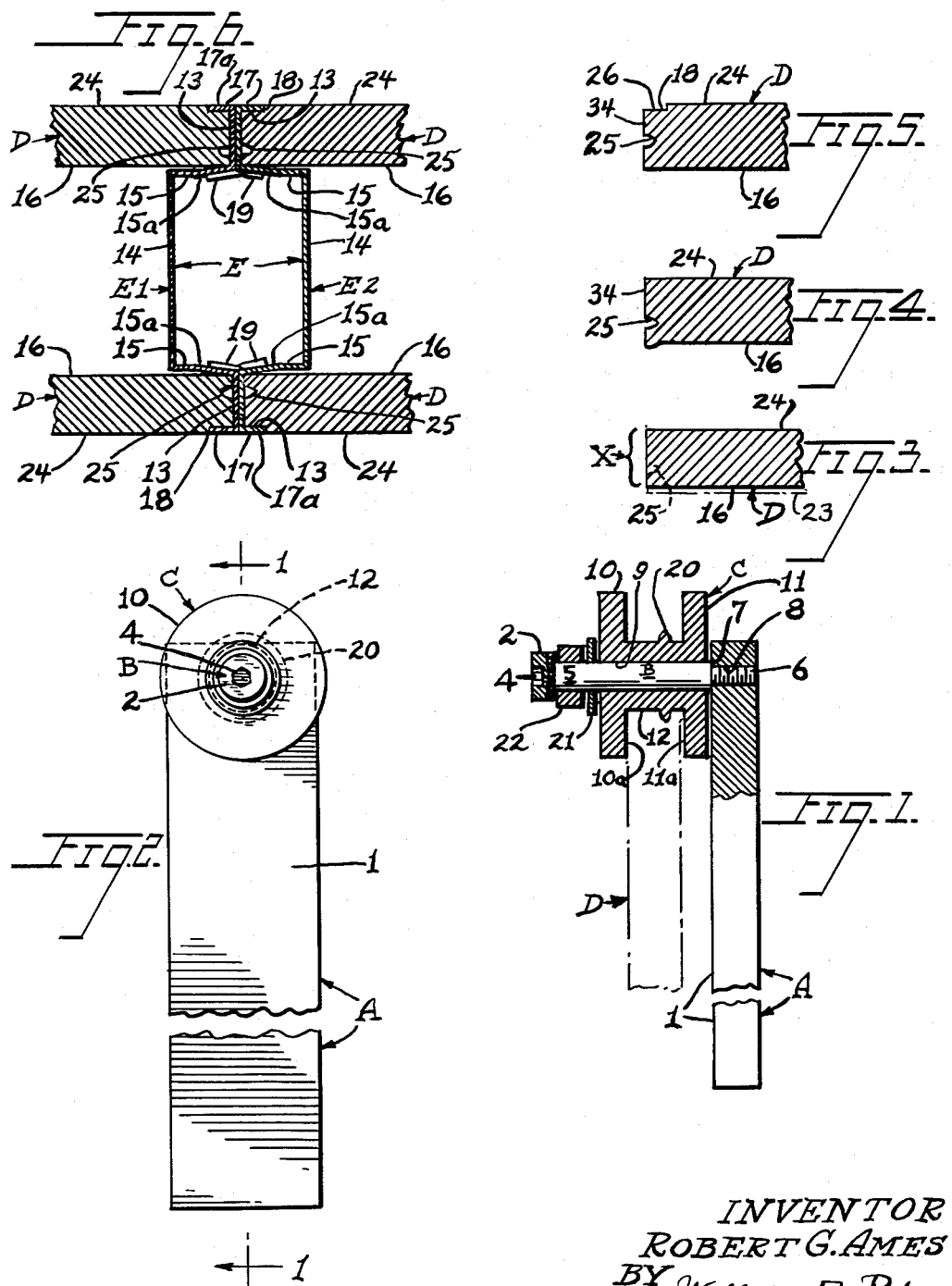

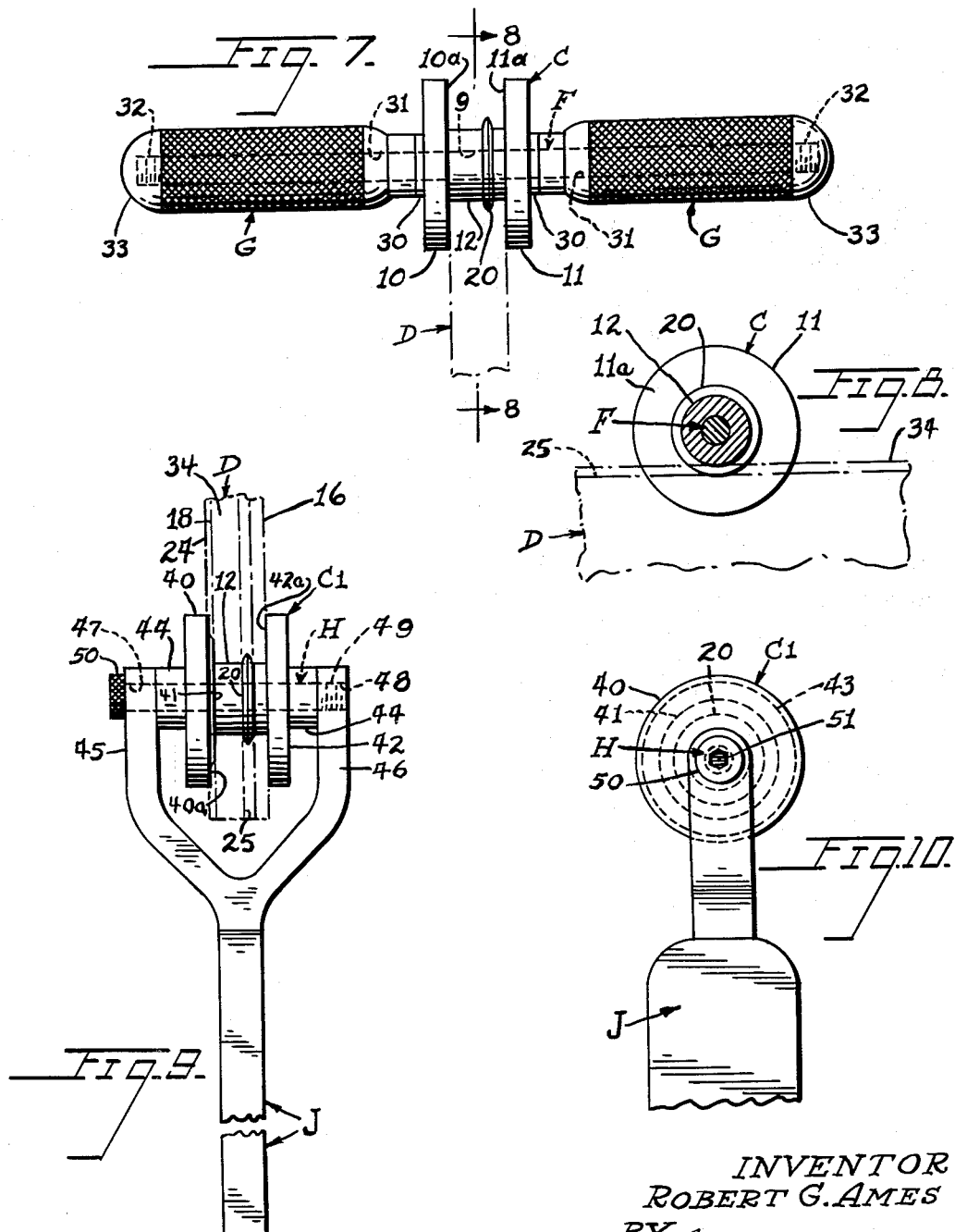

3,259,983
EMBOSSING TOOL FOR INCREASING THE
EDGE THICKNESS OF WALLBOARD
Robert G. Ames, Hillsborough, Calif., assignor to Ames
Taping Tool Systems Manufacturing Co., Harvey, Ill.,
a corporation of Illinois
Filed Apr. 9, 1964, Ser. No. 358,491
8 Claims. (Cl. 30—365)

The present invention relates to improvements in an embossing tool for increasing the edge thickness of wallboard, and it consists in the combination, construction, and arrangement of parts as hereinafter described and claimed.

Wallboard sheets are provided in standard sizes and thicknesses. In the mass production of wallboard sheets of a certain thickness, it is difficult to make every sheet exactly the same thickness. Where wallboards are supported by metal studs that have channels for receiving the adjacent edges of the wallboards, it is vital that these edges be of the same thickness so as to be frictionally received in the metal stud channels in order that the wallboards be properly supported.

In my copending application on a metal stud, Serial No. 292,996, filed July 5, 1963, I disclose one type of stud that has vertical channels for receiving the adjacent edges of wallboards. These channels are of a predetermined width and they are designed to receive the edges of wallboards that have slightly a greater width so that the wallboard edges will be frictionally gripped by the sides of the channels. If a wallboard has an edge that is slightly less in thickness than the width of the channel in which the edge is received, then this edge must be increased in thickness.

An object of my invention is to provide an embossing tool that can be moved along the wallboard edge which is to be increased in thickness and will emboss a groove in the edge for increasing its thickness. In the type of metal stud shown in my copending application, each channel has an outer flange that is received in a groove provided in the outer face of the wallboard and each channel has an inner flange with an inclined portion that frictionally engages with an inclined surface provided on the inner face of the wallboard.

A further object of my invention is to provide for a modified form of tool in which novel means is provided for embossing a recess on the outer surface of the wallboard at the same time as a groove is formed in the wallboard edge lying adjacent to this surface so as to make this edge of the desired thickness. The modified form of tool will have means for limiting the thickness of the wallboard edge being worked upon so that this edge when made thicker, will be receivable in a channel of the metal stud and the outer and inner faces of the wallboard will be gripped by the outer flange of the channel and by the inclined portion of the inner channel flange.

Another modified form of my tool makes use of two handles whose axes are in alignment with each other.

The wallboard embossing tool is simple in construction and is durable and efficient for the purpose intended.

Other objects and advantages will appear as the specification continues. The novel features of the invention will be set forth in the appended claims.

DRAWINGS

For a better understanding of my invention, reference should be made to the accompanying drawings, forming part of this specification, in which:

FIGURE 1 is a sectional view through my wallboard embossing tool and it is taken along the line 1—1 of FIGURE 2.

FIGURE 2 is an end elevation of the device when looking at the left hand end in FIGURE 1.

FIGURE 3 illustrates a piece of wallboard where I show how the use of my embossing tool along an edge of the wallboard will make this edge thicker. My present tool is designed to be used on wallboard whose thickness is less than that required.

FIGURE 4 shows the wallboard with an edge made thicker by the use of the embossing tool and further shows the groove made in the edge by the tool.

FIGURE 5 is a view showing the wallboard with a groove in its outer face. The groove and the inclined surface are made by a modified form of my embossing tool shown in FIGURE 9. They can also be made by another form of embossing tool illustrated, described and claimed in a copending patent application, Serial No. 358,490, filed April 9, 1964.

FIGURE 6 is a sectional view of a portion of a wall or a partition that makes use of metal studs of the type shown in my copending application, Serial No. 292,996, filed July 5, 1963. The metal stud is designed to receive the vertical edges of two sections of wallboard. The metal stud can also receive two sections of laminated plywood if so desired. If the metal stud supports an inside partition, then also four sections that are connected to the stud may be wallboard sections.

FIGURE 7 is an elevational view of a modified form of my embossing tool which has handles that are axially aligned with each other.

FIGURE 8 is a vertical section taken along the line 8—8 of FIGURE 7.

FIGURE 9 is an elevational view of another modified form of my embossing tool.

FIGURE 10 is an end view of the embossing tool when looking at the left hand end in FIGURE 9.

While I have shown only the preferred forms of my invention, it should be understood that various changes, or modifications, may be made within the scope of the annexed claims without departing from the spirit thereof.

DETAILED DESCRIPTION

In FIGURES 1 and 2, I show a sectional view and an end view of my embossing tool. This tool comprises a handle indicated generally at A and the handle carries a shaft B at one end and the axis of the shaft is normal to the face 1 of the handle. The shaft B has a head 2 that is provided with a socket 4 whose wall is of a polygon shape such as a hexagon. The shaft has a cylindrical portion 5 and a threaded end 6. A shoulder 7 is placed at the juncture of the cylindrical portion 5 and the threaded end 6.

The handle A has a threaded bore 8 for receiving the threaded end 6 of the shaft. I rotatably mount an embossing wheel or die indicated generally at C. The embossing wheel or die has a central bore 9 for rotatably receiving the cylindrical portion 5 of the shaft B. The wheel or die C also has end discs 10 and 11 that are spaced from each other by a hub 12. The space between the inner surfaces 10a and 11a is wide enough to receive the thickness of a wallboard indicated generally at D by the dot-dash lines in FIGURE 1. My tool is used for widening the thickness of a wallboard edge that is too thin to be tightly received in a channel 13 of a metal stud E, shown in FIGURE 6. It is possible to have one disc instead of two. If one disc is used, the operator would keep the face of the disc in contact with the adjacent wallboard face so that the embossed groove in the wallboard edge would be in the proper position.

The metal stud E is preferably of the type shown in my copending application for a Metal Stud, Serial No. 292,996, filed July 5, 1963. The metal stud comprises two identical halves E1 and E2. Each half has a web portion 14 that spaces two parallel wallboards D the proper distance apart to form a partition wall or other type of wall. The webs 14 of both metal stud halves E1, E2 have parallel side flanges 15 and these flanges bear against the inner surfaces 16 of the two wallboards D. The two side flanges 15 have outwardly flaired inclined portions 15a and then these outwardly flaired inclined portions also form one side of the wallboard receiving channels 13. These inclined portions 15a force the wallboard out against the flanges 17 insuring a snug fit in the channel and a level exterior plane. Each metal stud half E1 and E2 has two channels 13 that are designed to receive the edges of the wallboards D. The channels 13 have outer flanges 17 and the wallboards D are grooved at 18 by another embossing tool shown in my copending application, Serial No. 358,490, filed April 9, 1964. The wallboard grooves 18 receive the metal stud flanges 17. FIGURE 6 shows both metal half studs E1 and E2 provided with tongues 19 that are spaced along the lengths of the half studs and are designed to frictionally contact with the inclined portion 15a of the opposite half stud. These tongues will prevent lateral movement between the two half studs.

Again referring to FIGURES 1 and 2, it will be seen that I provide the hub 12 of the embossing wheel or die C with an annular rib 20. Two washers 21 and 22 are mounted on the cylindrical portion 5 of the shaft B and are placed between the disc 10 of the embossing wheel or die C and the head 2 of the shaft B. The wheel or die C is free to rotate on the cylindrical portion 5 of the shaft B.

In FIGURE 3, I show a portion of a wallboard D whose edge thickness which is indicated by the bracket X, is less than the desired width so as to be received in the channel 13. The dot-dash line 23 in FIGURE 3 parallels one face 16 and is spaced from this face for indicating that the wallboard D must have its edge increased in thickness up to a point where it will equal the thickness indicated by the dot-dash line.

My tool is used by the operator for embossing a groove shown by the dotted line 25 in FIGURE 3 at the edge of the wallboard D for increasing the thickness of the wallboard edge. FIGURE 1 shows the wallboard D received between the end discs 10 and 11. The operator grasps the handle A of the tool and moves the handle for forcing the annular rib 20 into the edge of the wallboard. The operator rolls the tool along the edge of the wallboard while forcing the annular rib 20 into its edge. The annular rib will have the effect of forcing the displaced material outwardly to thicken the edge. The inner faces 10a and 11a of the end disc 10 and 11 will limit the extent to which the wallboard edge is thickened. FIGURE 4 shows the wallboard D after the annular rib 20 has formed the groove 25 in the edge of the wallboard. The wallboard D shown in FIGURE 4 is thicker along its edge than the edge of the wallboard shown in FIGURE 3. The tool is moved along the entire edge of the wallboard so as to increase the thickness of the board edge. The end discs 10 and 11 will prevent the wallboard from being increased in thickness to too great an extent.

Before the wallboard D is ready to be received in the channel 13 of the metal stud E, it might be desirable to have it be provided with a groove 26 on the outer surface 24 of the wallboard as shown in FIGURE 5. In my copending application, Serial No. 358,490, filed April 9, 1964, I disclose and claim an embossing tool which will form the groove 26 on the outer face 24 of wallboard that does not have to have its edge increased in thickness.

When the wallboard D of FIGURE 5 is placed in the channel 13 of the metal stud E, the groove 18 on the outer surface 24 of the wallboard will receive the outer flange 17 of the metal stud. This will cause the outer surface 17a of the flange 17 to lie flush with the outer surface 24 of the wallboard D. The inner face 16 of the wallboard D that lies adjacent to the edge 34 that has been made thicker, will press against the inclined portion 15a of the metal stud E and will force the surface 26 of the groove 18 against the inner surface of the flange 17. This will insure a snug fit in the channel and will cause the wallboard outer surface 24 to lie flush with the outer surface of the flange 17 and provide a level exterior plane for both. In this way any slight irregularities in the thickness of the wallboard edge will be compensated for.

FIGURE 6 shows the metal stud E receiving four sections of wallboard D. This type of construction would be for a curtain partition that is not designed to carry any load. If the metal stud E is used for an outer wall, then two of the wallboards D could be eliminated and plywood or other hard board, not shown, substituted. Plywood or hard board would be on the outer face of the building and they could be covered in any manner desired. For example, metal lath or screening could be secured to the plywood boards and these would support a stucco outer finish for the building. I do not wish to be confined to any particular type of building structure. The present invention deals with an embossing tool that will increase the thickness of a wallboard edge that is too thin. The tool will not increase the thickness beyond the desired limit. The embossing groove 25 is made nearer to the inner face 16 of the wallboard than to the outer face 24. This will prevent any distortion of the outer wallboard face which might result if the groove 25 were made closer to the outer surface 24 than to the inner surface 16.

In FIGURE 7, I show a slightly modified form of the invention. The embossing wheel or die C remains the same as that shown in FIGURES 1 and 2 and therefore the same reference numerals will be applied to the wheel C shown in FIGURE 7 as are used on the same wheel or die shown in FIGURE 1. In place of the shaft B, shown in FIGURE 1, I make use of an elongated shaft F. This shaft is received in the central bore 9 in the embossing wheel or die C and the ends of the shaft project a considerable distance beyond the discs 10 and 11. A washer 30 is placed on each end of the shaft F and will contact with the outer faces of the end discs 10 and 11. Two handles G have central bores 31 and these receive the ends of the shaft F that extend beyond the washers 30. The handles G are free to rotate on the shaft.

It will also be noted from FIGURE 7 that the ends of the shaft F are threaded at 32 and end pieces 33 have threaded central bores for receiving the threaded portions 32 of the shaft. In this way the handles G are secured to the shaft F and are free to rotate on the shaft. The embossing wheel or die C is also free to rotate on the shaft F. I have indicated one means for securing the handles G to the shaft F.

In the use of the modified form of embossing tool shown in FIGURES 7 and 8, the operator grasps the handles G with his two hands and then inserts the edge of a wallboard D between the end discs 10 and 11. Both FIGURES 7 and 8 illustrate the wallboard D received between the end discs of the embossing wheel or die C. The operator moves the tool along the edge 34 of the wallboard whose thickness is less than that required to be received in the channel 13 of the metal stud shown in FIGURE 6. A movement of the embossing tool along the wallboard edge 34 will cause the annular rib 20 to form the groove 25 shown by the dot-dash lines in FIGURE 8. This groove will be coextensive with the length of the edge 34. The end discs 10 and 11 will prevent the wallboard thickness from being increased beyond a predetermined point.

In FIGURES 9 and 10, I show still another modified form of my embossing tool. The embossing wheel or die C1 differs slightly from the embossing wheel C shown in FIGURES 1, 2, 7 and 8. The end disc 40 is similar to the end disc 10 except that the inner face 40a of this end disc has a disc-shaped projection 41 that is integral with the disc. It will be seen that when a wallboard is recevied between the end disc 40 and another end disc 42 (corresponding to the end disc 11 of the embossing wheel or die C) then the wallboard D will have the groove 18 formed in its outer face 24 as shown in FIGURE 5 of this groove will be formed at the same time that the groove 25 is formed in the edge 34 of the wallboard.

The embossing wheel or die C1 is rotatably mounted on a shaft H. I mount washers 44 on the shaft H and these washers contact with the end discs 40 and 42. I provide a handle J that has a yoke-shaped portion at one end providing the handle with two arms 45 and 46. The arm 45 has a bore 47 therein for receiving the shaft H and the arm 46 has a threaded bore 48 for receiving the threaded end 49 of the shaft H. The opposite end of the shaft is provided with a head 50 and this head bears against the outer surface of the arm 45. FIGURE 10 shows the head 50 of the shaft H as being provided with a recess 51 whose side wall is in the shape of a polygon such as a hexagon.

The embossing tool shown in FIGURES 9 and 10 is used in much the same manner as the tool shown in FIGURES 1 and 2. However, the embossing die C1 of the tool not only will increase the thickness of the edge of a wallboard D that is too thin, but at the same time will form the groove 18 in the outer face 24 of the wallboard for receiving the flange 17 of a metal stud E. The end disc 42 has an inner face 42a. The wallboard groove 18 shown in FIGURE 5, has a depressed surface 26 that bears against the inner surface of the metal stud outer flange 17.

I claim:
1. A tool for embossing the edge of wallboard for increasing the thickness of the edge and comprising:
   (a) a cylindrical member adapted to be rolled along an edge of a wallboard that is to be increased in thickness and having an axial bore extending therethrough;
   (b) said cylindrical member having an annular rib extending therearound and projecting outwardly therefrom and adapted to be forced into the wallboard edge to form a groove for increasing the thickness of the edge;
   (c) said cylindrical member having end discs for guiding said member along the wallboard edge and for limiting the extent to which said rib and cylindrical member increases the thickness of the edge;
   (d) one of said discs having a circular projection on its inner surface for forming a groove on the surface of the wallboard and adjacent to the edge being increased in thickness; and
   (e) means for moving said cylindrical member along the wallboard edge.

2. The combination as set forth in claim 1: and in which said means for moving said cylindrical member includes
   (a) a shaft extending centrally through said cylindrical member for rotatably supporting said member; and
   (b) a handle for supporting said shaft.

3. The combination as set forth in claim 2: and in which
   (a) said handle has a bifurcated end providing two parallel arms that are adapted to straddle said cylindrical member with its end discs; said arms supporting the ends of said shaft.

4. The combination as set forth in claim 1: and which (a) said annular rib has its plane paralleling the adjacent inner surface plane of the disc-shaped member that does not have said circular projection and being disposed closer to this inner surface plane than to said circular projection.

5. A tool for embossing the edge of wallboard for increasing the thickness of the edge and comprising:
   (a) a cylindrical member adapted to be rolled along an edge of a wallboard that is to be increased in thickness;
   (b) said cylindrical member having an annular rib extending therearound and adapted to be forced into the wallboard edge over which the cylindrical member rolls to form a groove in the edge for increasing the thickness of the edge;
   (c) means for moving the cylindrical member along the wallboard edge; and
   (d) a disc-shaped member disposed at each end of said cylindrical member; the width of the space between the inner surfaces of said members determining the final thickness of the wallboard edge while the tool is being used.

6. The combination as set forth in claim 5: and in which
   (a) said annular rib has its plane paralleling the adjacent inner surface plane of one of said disc-shaped members, and is positioned closer to this disc-shaped member than to the other disc-shaped member.

7. A tool for embossing the edge of wallboard for increasing the thickness of the edge and comprising:
   (a) a cylindrical member adapted to be rolled along an edge of a wallboard that is to be increased in thickness and having an axial bore extending therethrough;
   (b) said cylindrical member having an annular rib extending therearound and projecting outwardly therefrom and adapted to be forced into the wallboard edge to form a groove for increasing the thickness of the edge;
   (c) a shaft extending through the axial bore in said cylindrical member for rotatably supporting it and having ends projecting beyond both ends of said cylindrical member;
   (d) hand grips mounted on the projecting ends of said shaft; and
   (e) said cylindrical member having end discs for guiding said member along the wallboard edge and for limiting the extent to which said rib and cylindrical member increases the thickness of the edge.

8. The combinaion as set forth in claim 7: and in which
   (a) said annular rib has its plane paralleling the adjacent inner surface plane of one of said disc-shaped members, and is positioned closer to this disc-shaped member than to the other disc-shaped member.

References Cited by the Examiner

UNITED STATES PATENTS

| | | | |
|---|---|---|---|
| 932,631 | 8/1909 | Molnar | 30—292 X |
| 1,108,161 | 8/1914 | Field | 30—292 |
| 1,645,385 | 10/1927 | Kaplan | 30—365 |
| 2,829,436 | 4/1958 | Leinwebber | 33—42 |

WILLIAM FELDMAN, *Primary Examiner.*

JAMES L. JONES, JR., *Examiner.*